(12) United States Patent
Stack et al.

(10) Patent No.: US 8,833,148 B2
(45) Date of Patent: Sep. 16, 2014

(54) BI-FUEL INJECTOR RELAY DIAGNOSTIC

(75) Inventors: Robert G. Stack, Grand Blanc, MI (US); Michael Cottrell, White Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/605,013

(22) Filed: Sep. 6, 2012

(65) Prior Publication Data

US 2014/0060165 A1   Mar. 6, 2014

(51) Int. Cl.
*G01M 15/02*   (2006.01)

(52) U.S. Cl.
USPC ...................................... 73/114.45

(58) Field of Classification Search
USPC ...................................... 73/114.45
See application file for complete search history.

(56) References Cited

U.S. PATENT DOCUMENTS

| | | | | |
|---|---|---|---|---|
| 5,735,253 A * | 4/1998 | Perotto et al. | ............ | 123/406.47 |
| 6,705,291 B2 * | 3/2004 | Rueger et al. | .................. | 123/467 |
| 6,951,210 B2 * | 10/2005 | Landi et al. | .................... | 123/525 |
| 7,045,916 B2 * | 5/2006 | Stolt et al. | ....................... | 307/116 |
| 7,685,997 B2 * | 3/2010 | Zanotti et al. | .................. | 123/478 |
| 7,918,207 B2 * | 4/2011 | Pursifull et al. | ............. | 123/300 |
| 8,008,876 B2 * | 8/2011 | Yonemori et al. | ............. | 318/151 |
| 8,044,531 B2 * | 10/2011 | Kobayashi et al. | .......... | 307/10.6 |
| 8,161,946 B2 * | 4/2012 | Pursifull | ........................ | 123/479 |
| 8,193,816 B2 * | 6/2012 | Perryman et al. | ............. | 324/522 |
| 8,375,923 B2 * | 2/2013 | Pursifull | ........................ | 123/479 |
| 8,444,060 B2 * | 5/2013 | Yan | ..................................... | 239/5 |
| 2004/0240141 A1 * | 12/2004 | Stolt et al. | ...................... | 361/160 |
| 2008/0302338 A1 * | 12/2008 | Zanotti et al. | .................. | 123/478 |
| 2010/0078994 A1 * | 4/2010 | Kobayashi et al. | .......... | 307/10.6 |
| 2011/0125386 A1 | 5/2011 | Pursifull | | |
| 2011/0276253 A1 | 11/2011 | Kjar et al. | | |

FOREIGN PATENT DOCUMENTS

EP     2000652 A1   12/2008
WO   2012089618 A1    7/2012

OTHER PUBLICATIONS

International Search Report and Written Opinion dated Nov. 7, 2013 for International Application No. PCT/US2013/055757, International Filing Date Aug. 20, 2013.

* cited by examiner

*Primary Examiner* — Freddie Kirkland, III
(74) *Attorney, Agent, or Firm* — Ralph E Smith

(57) ABSTRACT

An injector relay diagnostic system is provided. The system comprises a first fuel injector, a first electrical relay disposed between an electrical potential and the first fuel injector, wherein the first electrical relay is configured to connect the first fuel injector to the electrical potential upon receipt of a first control signal, and a control module configured to transmit the first control signal to the first electrical relay, receive an output from the first fuel injector, and determine a state of the first electrical relay by comparing the output from the first fuel injector to a predetermined parameter.

14 Claims, 3 Drawing Sheets

BI-FUEL INJECTOR RELAY DIAGNOSTIC

FIELD

The present disclosure relates to diagnostic tools for combustion engines, more particularly, a diagnostic tool for testing functionality of an electrical relay that controls power to a set of fuel injectors.

BACKGROUND

A bi-fuel internal combustion engine is capable of running on two or more different types of fuel. Modern bi-fuel engines utilize different fuel injectors for each type of fuel. For example, a bi-fuel engine may include a fuel system that utilizes separate liquid and gaseous fuel injectors for each cylinder of the engine. The use of multiple fuel types may provide performance benefits over a variety of different operating conditions. However, improper operation of the electrical relays for the injectors may negatively affect vehicle performance. For example, if the contacts of an electrical relay become stuck closed, the engine may receive double fueling. Because these relays are an important part of proper engine operation, on board diagnosis is important.

What is needed, therefore, is a system and method for diagnosing proper operation of an electrical relay that controls power to a fuel injector. What is also needed is a system and method for performing this diagnosis that does not increase cost or complexity of the fuel injector relay circuitry.

SUMMARY

In one form, the present disclosure provides a system for diagnosing operation of an injector relay. The system includes a first fuel injector, a first electrical relay disposed between an electrical potential and the first fuel injector, wherein the first electrical relay is configured to connect the first fuel injector to the electrical potential upon receipt of a first control signal, and a control module configured to transmit the first control signal to the first electrical relay, receive an output from the first fuel injector, and determine a state of the first electrical relay by comparing the output from the first fuel injector to a predetermined parameter.

In another form, the present disclosure provides a method for diagnosing operation of an injector relay. The method includes the steps of transmitting a control signal to a first electrical relay disposed between an electrical potential and a first fuel injector, receiving an output from the first fuel injector, and determining a state of the first electrical relay by comparing the output from the first fuel injector to a predetermined parameter.

The present disclosure provides a number of benefits over the prior art by reducing the cost and complexity of the circuitry needed for a bi-fuel injection system. First, the system and method disclosed herein remove the need for injector relays to have dedicated diagnostic outputs. Second, because injector relays no longer need dedicated diagnostic outputs, the amount of wiring needed for the fuel injection control system is reduced. Finally, instead of needing a separate fuel injection control system for each for each set of fuel injectors, the present disclosure allows a single fuel injection control system to control multiple types of fuel injectors.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION

Before describing the disclosed embodiments of the technology in detail, it is to be understood that the technology is not limited in its application to the details of the particular arrangement shown herein since the technology is capable of other embodiments. Also, the terminology used herein is for the purpose of description and not of limitation.

Figure 1:
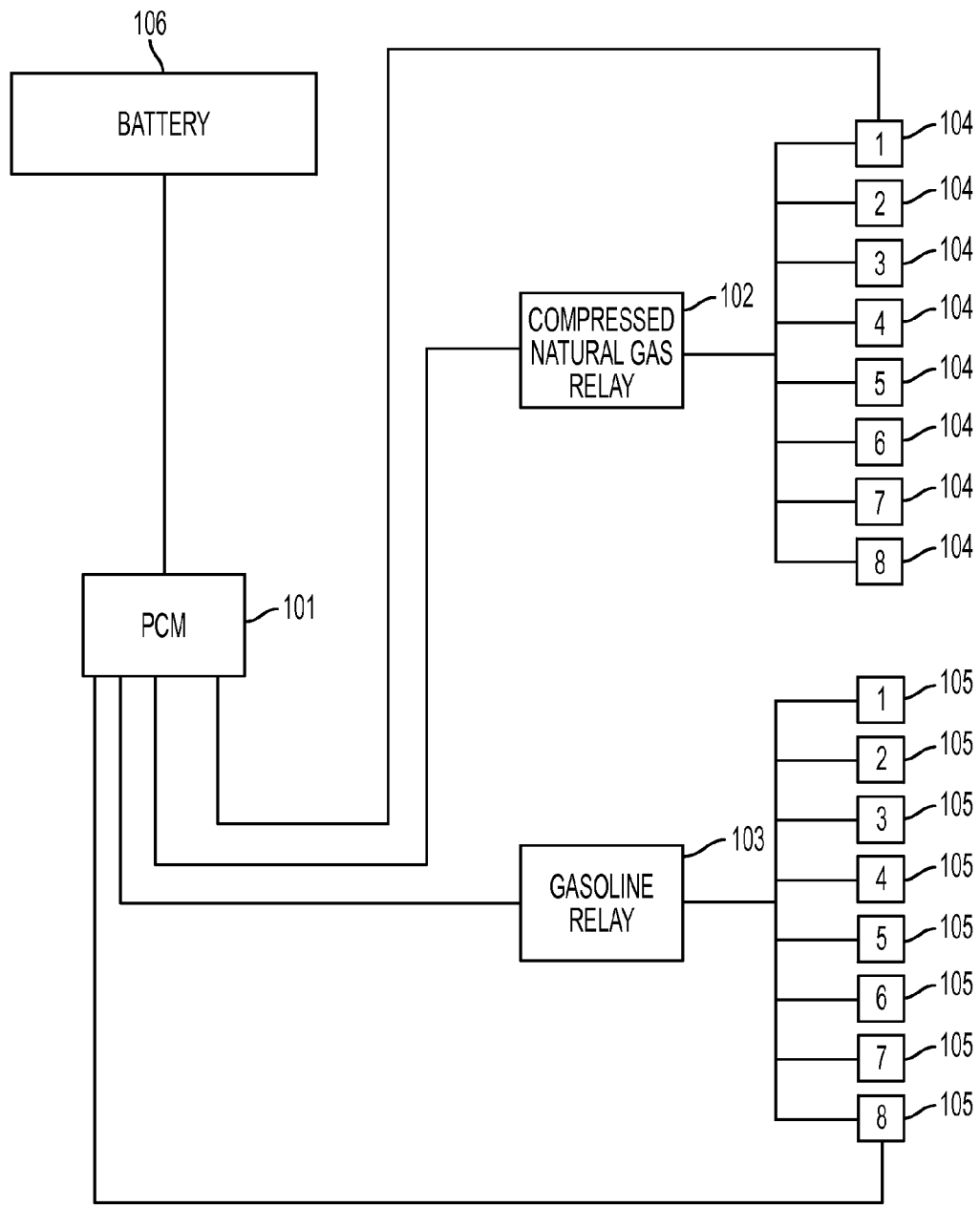
FIG. 1 is a block diagram of a system for diagnosing operation of an injector relay in accordance with the disclosed principles.

FIG. 1 is a block diagram showing a bi-fuel injector relay diagnostic system in accordance with the disclosed principles. The exemplary relay diagnostic system includes of a powertrain control module ("PCM") 101, a compressed natural gas relay 102, a gasoline relay 103, compressed natural gas injectors 104, and gasoline injectors 105. The PCM 101 receives power from the vehicles power source, such as a battery 106. The PCM 101 controls operation of the compressed natural gas relay 102, the gasoline relay 103, the compressed natural gas injectors 104, and the gasoline injectors 105. Although the exemplary system has been descried as having only two injector relays and two sets of injectors, it should be appreciated that the disclosed principles could also apply to a system having more than two injector relays and more than two sets of injectors.

The compressed natural gas relay 102 is electrically connected between the PCM 101 and the compressed natural gas injectors 104. Likewise, the gasoline relay 103 is electrically connected between the PCM 101 and the gasoline injectors 105. The PCM 101 is configured to supply power to the injector relays from the vehicle's power source 106. When compressed natural gas injection is desired, the PCM 101 sends a control signal to the compressed natural gas relay 102. Upon receipt of the control signal, the compressed natural gas relay 102 connects the compressed natural gas injectors 104 to the power source. Conversely, if gasoline injection is desired, the PCM 101 sends a control signal to the gasoline relay 103. Upon receipt of the control signal, the gasoline relay 103 connects the gasoline injectors 105 to the power source.

The PCM 101 also controls operation of the compressed natural gas injectors 104 and the gasoline injectors 105. Both the compressed natural gas injectors 105 and the gasoline injectors are electrically connected to the PCM 101. When compressed natural gas injection is desired, the PCM 101 signals the compressed natural gas relay 102 to connect the compressed natural gas injectors 104 to the power source as described above. The PCM 101 then sends a pulse signal to the compressed natural gas injectors 104 when injection is desired. Likewise, when gasoline injection is desired, the PCM 101 signals the gasoline relay 103 to connect the gasoline injectors 105 to the power source as described above. The PCM 101 then sends a pulse signal to the gasoline injectors 105 when injection is desired.

In the exemplary embodiment, both the compressed natural gas injectors 104 and the gasoline injectors 105 have dedicated output signal lines that provide a feedback signal to the PCM 101, while the compressed natural gas relay 102 and the gasoline relay 103 do not. Thus, to diagnose operation of the compressed natural gas relay 102 and the gasoline relay 103, the PCM 101 sends a pulse signal to either the compressed natural gas injectors 104 or the gasoline injectors 105 and infers a state of operation of the corresponding injector relay based on the state of the feedback signal. This method will be described in more detail below with reference to FIG. 2.

Preferably, injector diagnostics are performed when an injector relay 102, 103 does not an have injector pulse demand from the PCM 101. During this time, the PCM 101 can perform stuck-open and stuck-closed tests. In order to perform stuck-open and stuck-closed tests, the PCM 101 sends a pulse signal to an injector and determines whether that injector's relay is operating properly based upon an expected output from the injector. Typically, the test comprises energizing injector coils long enough to ensure that the coil field is energized, but short enough that the injector pintle never leaves the seat. This brief energizing of the injector coil can be accomplished, for example, by sending a 70 volt signal to the injector for less than 800 microseconds. When energy to the coil is stopped, the field collapses and the energy wants to return to the source, or "fly back." The PCM 101 monitors the injector for this "fly back" signal when performing an injector relay diagnostic. In order to perform the stuck-closed test, the PCM 101 sends a pulse signal to an injector and expects to receive no output from the injector because the injector is not supposed to be connected to the power source. If an output is received from the injector, it means a fault has been detected. A stuck-open test is used when a relay is powered on, and tests whether one or more contacts in the relay fail to occur. To perform a stuck-open test, the PCM 101 sends a pulse signal to an injector and expects to receive an output. If no output is detected via the output signal line, a fault has been detected.

For example, the PCM 101 would perform a stuck open test on the gasoline relay 103 where only gasoline injection is required. Because gasoline injection is desired, the gasoline relay 103 should have connected the gasoline injector 105 to the power source. To perform the stuck-open test, the PCM 101 sends a pulse signal to the gasoline injectors 105, and expects to receive a corresponding output via the output signal line. If the PCM 101 does not receive a corresponding output from the gasoline injectors 105, then the PCM 101 infers that the gasoline relay 103 has not connected the gasoline injectors 105 to the power source. In the same scenario, the PCM 101 may also perform a stuck-closed test on the compressed natural gas relay 102. Because compressed natural gas injection is not desired, the compressed natural gas relay 102 should have disconnected the compressed natural gas injectors 104 from the power source. In order to perform the stuck-closed test on the compressed natural gas relay 102, the PCM 101 sends a pulse signal to the compressed natural gas injectors 104, and expects to receive no corresponding output via the output signal line. If the PCM 101 receives an output from the compressed natural gas injectors 104, then the compressed natural gas relay 102 has improperly connected the compressed natural gas injectors 104 to the power source.

Figure 2:
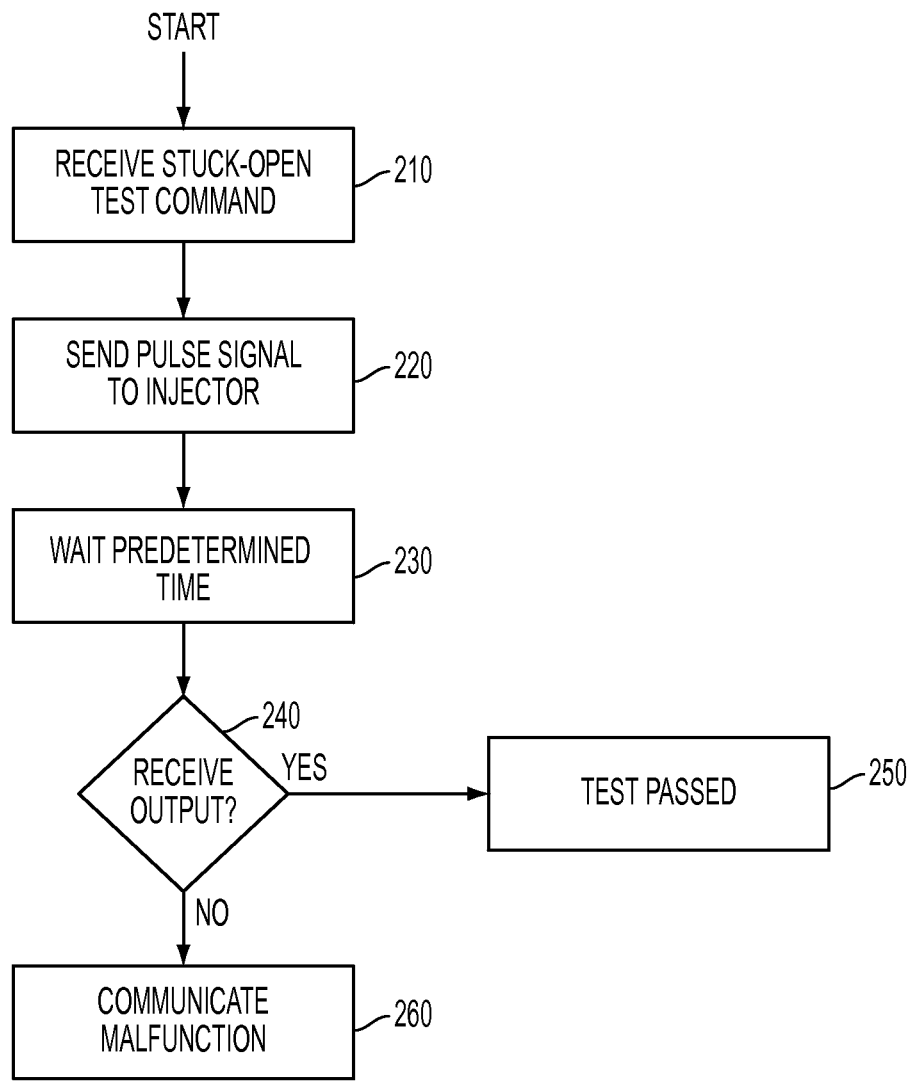
FIG. 2 is a flow chart showing a method for diagnosing whether the contacts of an injector relay have become stuck open in accordance with the disclosed principles.

FIG. 2 is a flow chart showing a method for diagnosing whether the contacts of an injector relay have become stuck open in accordance with the disclosed principles. The diagnostic begins at step 210 when the PCM 101 receives a command to perform the stuck-open test. After receiving the command to perform the test, the PCM 101 sends a pulse signal to the injector (step 220). The PCM 101 will then wait for a predetermined period of time (step 230) for receipt of an output signal (step 240). In the exemplary embodiment, the predetermined period of time is 5 ms. The PCM 101 then expects to receive an output signal from the injector when performing the stuck-open test. If the PCM 101 receives an output from the injector, the injector relay has passed the test and no action is needed (step 250). If the PCM 101 does not receive an output from the injector, the injector relay has failed the test. Consequently, the PCM 101 must then communicate that the injector relay is in a stuck-open (step 260).

Figure 3:
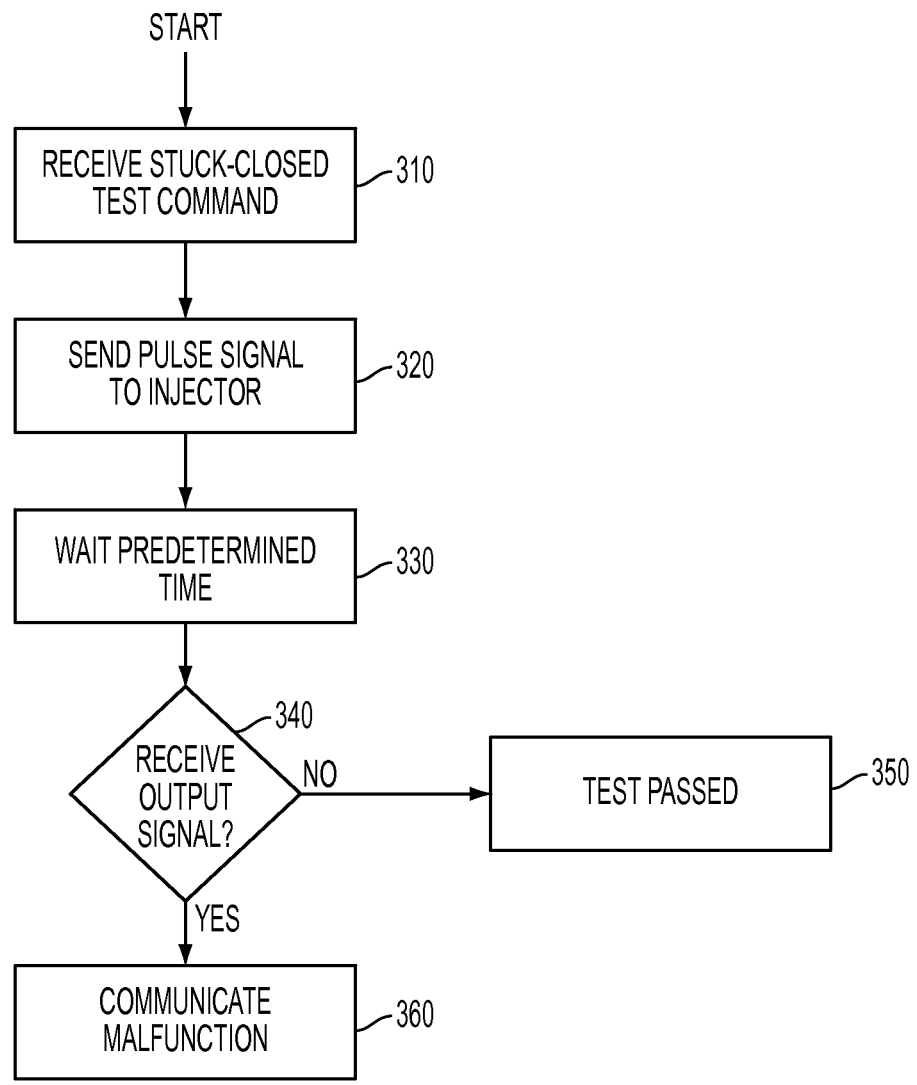
FIG. 3 is a flow chart showing a method for diagnosing whether the contacts of an injector relay have become stuck closed in accordance with the disclosed principles.

FIG. 3 is a flow chart showing a method for diagnosing whether the contacts of an injector relay have become stuck closed in accordance with disclosed principles. The diagnostic begins at step 310 when the PCM 101 receives a command to perform the stuck-closed test. As described above, the stuck-closed test is preferably performed when the injector relay is not in use. After receiving the command to perform the stuck-closed test, the PCM 101 sends a pulse signal to the injector (step 320). The PCM 101 will then wait for a predetermined period of time (step 330) for receipt of an output signal (step 340). In the exemplary embodiment, the PCM 101 expects to receive no output signal from the injector when performing the stuck-open test. If the PCM 101 does not receive an output from the injector, the injector relay has passed the test and no further action is needed (step 350). If the PCM 101 does receive an output from the injector, the injector relay has failed the test. Consequently, the PCM 101 must then communicate that the injector relay is stuck open (step 360) and not functioning.

With the above, an effective test of the injector relay can be conducted.

What is claimed is:

1. An injector relay diagnostic system comprising:
   a first fuel injector;
   a first electrical relay disposed between an electrical potential and the first fuel injector,
   wherein the first electrical relay is configured to connect the first fuel injector to the electrical potential upon receipt of a first control signal; and
   a control module configured to transmit the first control signal to the first electrical relay, receive an output from the first fuel injector, and determine a state of the first electrical relay by comparing the output from the first fuel injector to a first predetermined parameter.

2. The system of claim 1, further comprising a second fuel injector; and
   a second electrical relay disposed between the electrical potential and the second fuel injector, wherein the second electrical relay is configured to connect the second fuel injector to the electrical potential upon receipt of a second control signal.

3. The system of claim 2, wherein the control module is configured to transmit the second control signal to the second electrical relay, receive an output from the second fuel injector, and determine a state of the second electrical relay by comparing the output from the second fuel injector to a second predetermined parameter.

4. The system of claim 3, wherein the first fuel injector is a gasoline injector.

5. The system of claim 3, wherein the second fuel injector is a compressed natural gas injector.

6. The system of claim 3, wherein the first fuel injector is a gasoline injector and the second fuel injector is a compressed natural gas injector.

7. The system of claim 3, wherein the control module is configured to transmit a signal representative of the state of the first electrical relay.

8. The system of claim 3, wherein the control module is configured to transmit a signal representative of the state of the second electrical relay.

9. The system of claim 1, wherein the control module is configured to transmit a signal representative of the state of the first electrical relay.

10. A method for testing an injector relay, the method comprising:

transmitting a control signal to a first electrical relay disposed between an electrical potential and a first fuel injector;

receiving an output from the first fuel injector; and determining a state of the first electrical relay by comparing the output from the first fuel injector to a first predetermined parameter.

11. The method of claim 10, further comprising transmitting a signal representative of the state of the first electrical relay.

12. The method of claim 10, further comprising transmitting a second control signal to a second electrical relay disposed between the electrical potential and a second fuel injector;

receiving an output from the second fuel injector; and determining a state of the second electrical relay by comparing the output from the second fuel injector to a second predetermined parameter.

13. The method of claim 12, further comprising transmitting a signal representative of the state of the first electrical relay.

14. The method of claim 12, further comprising transmitting a signal representative of the state of the second electrical relay.

* * * * *